J. NEY, Jr. & R. NEY.
CELERY BLEACHING DEVICE.
APPLICATION FILED AUG. 20, 1913.
1,124,640.
Patented Jan. 12, 1915.
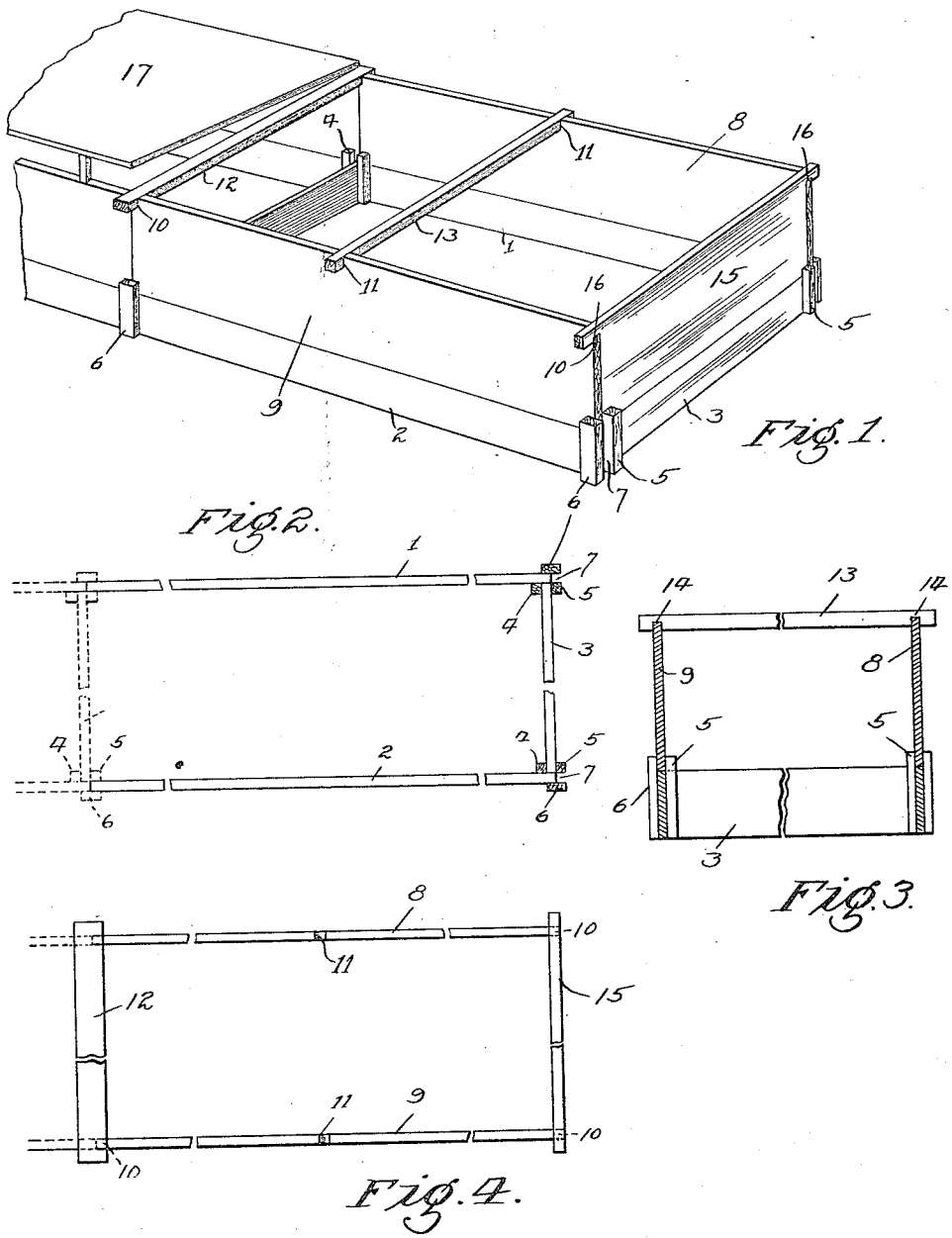
WITNESSES:
H. A. Stock
R. M. Ayarza
INVENTORS
Jacob Ney, Jr.
Rosa Ney
BY
Harry C. Schroeder
ATTORNEY

UNITED STATES PATENT OFFICE.

JACOB NEY, JR., AND ROSA NEY, OF STEGE, CALIFORNIA.

CELERY-BLEACHING DEVICE.

1,124,640.

Specification of Letters Patent. Patented Jan. 12, 1915.

Application filed August 20, 1913. Serial No. 785,773.

*To all whom it may concern:*

Be it known that we, JACOB NEY, Jr., and ROSA NEY, citizens of the United States, residing at Stege, in the county of Alameda and State of California, have invented certain new and useful Improvements in Celery-Bleaching Devices, of which the following is a specification.

This invention relates to improvements in apparatus for growing plants and more particularly to a frame used in connection therewith for regulating the growing conditions and for bleaching of celery.

With frames constructed in accordance with the following specification we grow celery continuously throughout the year and in all seasons obtain a plant having a superior flavor and color to that grown in the open. This condition is obtained on account of the ease with which the moisture and light are regulated and to a great extent the temperature.

Another advantage of our frame is; that being made in sections the parts are easily handled with little danger of damaging the plants, and at the same time when not in use the parts may be compactly stored.

With these and other objects in view our invention consists in the new and novel arrangement and construction of parts as herein described and illustrated in the attached drawing and as more particularly pointed out in the appended claims.

Referring to the drawing: Figure 1 is a view in perspective showing a section of a frame constructed in accordance with our invention. Fig. 2 is a view in plan of the base section. Fig. 3 is a view in section of the two parts superimposed. Fig. 4 is a view in plan of the upper section.

Denoting corresponding parts by the same numerals; the frame consists of a base composed of longitudinal side members 1 and 2 connected by cross member 3. In the corners between the side members and the connecting cross member 3 are blocks 4, fastened to the said side members and projecting above the edges thereof, and on the opposite side of 3 are fastened similar blocks 5, having their outer face in alinement with the end of cross member 3. On the outside of member 1 and 2 are other blocks 6 having a width twice that of blocks 4 and 5 and having half their width extending beyond their respective supporting member. In this manner is formed a groove 7 into which the next adjoining section is adapted to fit. As this portion of the frame is left almost permanently in the ground and is not much handled, the fact that one end has no connecting member does not detract from its utility as the next member holds these free ends spaced and the last frame in the row is provided with connecting cross members at both ends. In use this frame is placed on the ground and the space within up to the edge thereof is filled with carefully prepared earth into which the seedlings are transplanted, and on this frame as a foundation the super frame is erected. This latter consists of wide side members 8 and 9 having end notches 10 and intermediate notches 11; cross bars 12 and 13 are provided having notches 14 in the ends thereof half their depth and spaced apart equal to the width of the frame. Notches 10 and 11 are also cut half the depth of the cross rods so that when the latter are positioned their top is flush with the edge of side members 8 and 9, the notches preventing the latter from moving inwardly or outwardly. The bar 12 is made of sufficient width that it engages the notches 10 in the two abutting side members and on the last section there is provided an end member 15 having notched extensions 16 which fit the notches 10.

The bottom of the side members 8 and 9 are held by the projecting ends of the blocks 4, 5 and 6, the former two also serving to hold the member 14 against longitudinal movement. A lid 17 is provided for each section which normally makes a tight joint around the top of the super-frame.

In use, proper manipulation of the lid 17 serves to retain the moisture, to prevent the rays of the sun from entering when it is too hot, to retain the heat at night and to entirely exclude the light when blanching the stalks. In this manner may be obtained a rapid growth under favorable conditions which produces a long, crisp and well blanched stalk.

While the above is the preferred embodiment of our invention it will of course be understood that changes may be made in form and minor details without departing from the spirit thereof.

What we claim as new is:—

1. A frame of the character described comprising, a base composed of longitudinal side members, connecting cross members, blocks attached to the inside and outside of said longitudinal side members at the ends thereof, blocks attached to one side of said cross members at the ends thereof, said blocks extending above the top edges of said longitudinal side members and said cross members; a super frame composed of side members, the lower edge of said side members resting on the top edges of said longitudinal side members, being held by the projecting ends of the blocks attached thereto, and said side members being provided with notches in the top edges thereof, cross bars provided with notches complementary to the notches in said side members, end members for said super frame having notches adjacent the upper edges adapted to rest in complementary notches in said side members, and the lower edges of said end members being held between the projecting ends of the blocks on the inside of said longitudinal side members and the blocks on the ends of said connecting cross members.

2. A frame of the character described comprising a base composed of longitudinal side members, connecting cross members, upwardly projecting blocks attached to said members, and extending above the top edges thereof, two of said blocks being attached to the longitudinal side members at each end and on opposite sides thereof, and one block being attached to each end of said cross members; a super frame composed of side members, the lower edges of which are held by said upwardly projecting blocks attached to said longitudinal side members and having notches formed in the top edges thereof, cross bars provided with complementary notches adapted to seat in the notches of said side members, and end members resting on said cross members of the base, the lower edges being held by the said blocks on the inside of said longitudinal side members and the blocks on said cross members, and a lid adapted to rest on said side members, said cross bars, and said end members.

In testimony whereof we affix our signatures in presence of two witnesses.

JACOB NEY, JR.
ROSA NEY.

Witnesses:
  F. P. SCHROEDER,
  R. M. OYARZO.

Copies of this patent may be obtained for five cents each, by addressing the "Commissioner of Patents, Washington, D. C."